United States Patent [19]

Sumner et al.

[11] Patent Number: 5,515,365
[45] Date of Patent: May 7, 1996

[54] METHOD AND APPARATUS FOR REDUCING INTERFERENCE IN A TIME DIVISION DUPLEX COMMUNICATION SYSTEM

[75] Inventors: Terence E. Sumner, Hanover Park; Stephen H. Dunkerton, Riverwoods; John R. Melton, Bolingbrook, all of Ill.

[73] Assignee: Motorola, Inc., Schaumburg, Ill.

[21] Appl. No.: 316,975

[22] Filed: Oct. 3, 1994

[51] Int. Cl.$^6$ .................................................... H04L 5/14
[52] U.S. Cl. .................. 370/29; 370/32; 370/40; 375/285; 375/296; 375/346; 375/349; 455/50.1; 455/52.3; 455/62; 455/63; 455/65
[58] Field of Search ................................ 370/29, 32, 24, 370/40; 375/296, 285, 346, 349; 455/63, 62, 50.1, 65, 52.3

[56] References Cited

U.S. PATENT DOCUMENTS

| | | | |
|---|---|---|---|
| 4,267,592 | 5/1981 | Craiglow | 370/29 |
| 5,278,994 | 1/1994 | Black et al. | 455/126 |
| 5,319,799 | 6/1994 | Morita | 370/32 |
| 5,430,761 | 7/1995 | Bruckert et al. | 375/200 |

*Primary Examiner*—Hassan Kizuo
*Assistant Examiner*—Seema S. Rao
*Attorney, Agent, or Firm*—James A. Lamb

[57] ABSTRACT

A first transmitter (103) reduces an interference in a time division duplex (TDD) communication system (100). The first transmitter (103) alternates from a transmit state in which a first information signal (130) is transmitted to a standby state in which a residual signal (132) is transmitted. The first transmitter (103) includes a transmitter section (142) and a controller (141). The transmitter section (142) transmits the first information signal (130) and the residual signal (132). The transmitter section (142) includes a power amplifier (144) to amplify the first information signal (130) and the residual signal (132) to a power level; and an exciter (143) to control a carrier frequency of the first information signal (130) and the residual signal (132). The controller (141) is coupled to the power amplifier (144) and the exciter (143), for adjusting the power level and setting the carrier frequency.

12 Claims, 4 Drawing Sheets

5,515,365

METHOD AND APPARATUS FOR REDUCING INTERFERENCE IN A TIME DIVISION DUPLEX COMMUNICATION SYSTEM

FIELD OF THE INVENTION

This invention relates in general to time division duplex communication systems and in particular to means for reducing interference within a receiver used in the time division duplex communication systems.

BACKGROUND OF THE INVENTION

Known types of communication systems include time division duplex (TDD) communication systems, such as radio TDD communication systems and optical TDD communication systems, wherein a bi-directional communication path is established between two sites, each of which has a transmitter and receiver, and wherein the two transmitters are synchronized so that only one is transmitting an information signal at any time. Such TDD systems may be a point to point system, wherein the system comprises only two sites, or a point to multi-point system, wherein the system comprises a "central" site which establishes a communication link to one of a plurality of other sites. An example of a point to multi-point TDD system is a wide area selective call radio system having a central site, wherein the central site has a fixed, high power transmitter and a fixed receiver, and has separate transmit and receive antennas located near each other. The point to multi-point TDD system of this example further has a plurality of transportable selective call radios, such as mobile radios or pagers, located within range of the central transmitter and receiver antennas. The selective call radios typically are transceivers (single unit transmitter/receivers), each of which has a single transmit/receive antenna, although some selective call radios have separate antennas for transmission and reception.

A high power transmit signal is used in wide area TDD systems in order to achieve long communication ranges. The high power transmit signal is typically used in the central site transmitter. A high power transmit signal can also be used in some types of radios, such as mobile radios, in wide area TDD systems. As described above, one of the two transmitters involved in the bi-directional TDD link is in a standby state while the other is on (transmitting). After a duplex time period, which is determined based on the type of information being communicated, the one transmitter starts transmitting and the other transmitter goes to the standby state. For example, a typical TDD digitized voice communication will have a duplex time period of approximately a millisecond, while a TDD data communication can have time periods much longer, such as 1875 milliseconds. When the power level transmitted in the on state is high, e.g., over 100 Watts, a problem arises in completely eliminating the radiation of power from the transmitter when the transmitter is in the standby state. Currently available, cost effective implementations of power control circuits in transmitters can achieve a 90 to 100 dB reduction of the power emitted from the on state to the standby state. Unfortunately, the residual power thus emitted by a high power transmitter in the standby state can still be sufficient to cause interference within a receiver between the residual signal received from the standby transmitter and an information signal being received from an on transmitter, even when the receiver is moderately far (e.g., a mile or two) from the transmitter in the standby state.

Thus, what is needed is a means for reducing interference within a receiver between a residual signal from a first transmitter and an information signal from a second transmitter operating in a time division duplex communication system.

SUMMARY OF THE INVENTION

Accordingly, in a first aspect of the present invention, a method is for use in a first transmitter which reduces an interference in a time division duplex (TDD) communication system having the first transmitter, a second transmitter, and a receiver. The first transmitter alternates from a transmit state in which a first information signal is transmitted to a standby state in which a residual signal is transmitted. During the standby state of the first transmitter, the second transmitter transmits a second information signal. The interference occurs within the receiver between the residual signal and the second information signal. The receiver has a pass band for passing the second information signal. The method includes two steps. The first step is generating the residual signal at a residual power level when the first transmitter is in the standby state. The second step is offsetting a carrier frequency of the first transmitter to move the residual signal outside the pass band of the receiver when the first transmitter is in the standby state.

Accordingly, in a second aspect of the present invention a first transmitter reduces an interference in a time division duplex (TDD) communication system having the first transmitter, a second transmitter, and a receiver. The first transmitter alternates from a transmit state in which a first information signal is transmitted to a standby state in which a residual signal is transmitted. During the standby state of the first transmitter, the second transmitter transmits a second information signal. The interference occurs within the receiver between the residual signal and the second information signal. The receiver has a pass band for passing the second information signal. The first transmitter includes a transmitter section and a controller. The transmitter section transmits the first information signal and the residual signal. The transmitter section includes a power amplifier to amplify the first information signal and the residual signal to a power level; and an exciter to control a carrier frequency of the first information signal and the residual signal. The controller is coupled to the power amplifier and the exciter, for adjusting the power level and setting the carrier frequency.

Accordingly, in a third aspect of the present invention, a system transmitter reduces an interference in a time division duplex (TDD) radio communication system having the system transmitter, a selective call transceiver, and a system receiver. The system transmitter alternates from a transmit state in which a first information signal is transmitted to an standby state in which a residual signal is transmitted. During the standby state of the system transmitter, the selective call transceiver transmits a second information signal. The interference occurs within the system receiver between the residual signal and the second information signal. The system receiver has a pass band for passing the second information signal. The first information signal has a wide frequency range which is wider than the pass band of the system receiver.

The system transmitter includes a transmitter section and a controller section. The transmitter section transmits the first information signal and the residual signal. The transmitter section includes a power amplifier to amplify the first information signal and the residual signal to a power level. The transmitter section further includes an exciter to control a radio carrier frequency of the first information signal and the residual signal. The exciter has a modulation input for accepting a signal which modulates the first information signal. The controller is coupled to the power amplifier and the exciter for adjusting the power level to a low power state, for offsetting the radio carrier frequency outside the pass band and within the wide frequency range, for coupling a null signal to the modulation input when the system transmitter is in the standby state, and for adjusting the power level to a normal state and for setting the radio carrier frequency within the pass band of the system receiver when the system transmitter is in the transmit state.

Accordingly, in a fourth aspect of the present invention, a time division duplex (TDD) radio communication system reduces an interference. The system includes a system transmitter, a selective call transceiver, and a system receiver. The system transmitter alternates from a transmit state in which a first information signal is transmitted to a standby state in which a residual signal is transmitted. The selective call transceiver transmits a second information signal during the standby state of the system transmitter. The system receiver has a pass band for passing the second information signal. In the system receiver, an interference occurs between the residual signal and the second information signal. In the TDD radio communication system, the first information signal has a wide frequency range which is wider than the pass band of the system receiver.

The system transmitter includes a transmitter section and a controller section. The transmitter section transmits the first information signal and the residual signal. The transmitter section includes a power amplifier to amplify the first information signal and the residual signal to a power level. The transmitter section further includes an exciter to control a radio carrier frequency of the first information signal and the residual signal. The exciter has a modulation input for accepting a signal which modulates the first information signal. The controller is coupled to the power amplifier and the exciter for adjusting the power level to a low power state, for offsetting the radio carrier frequency outside the pass band and within the wide frequency range, and for coupling a null signal to the modulation input when the system transmitter is in the standby state, and for adjusting the power level to a normal state and for setting the radio carrier frequency within the pass band of the system receiver when the system transmitter is in the transmit state.

DETAILED DESCRIPTION OF THE DRAWINGS

Figure 1:
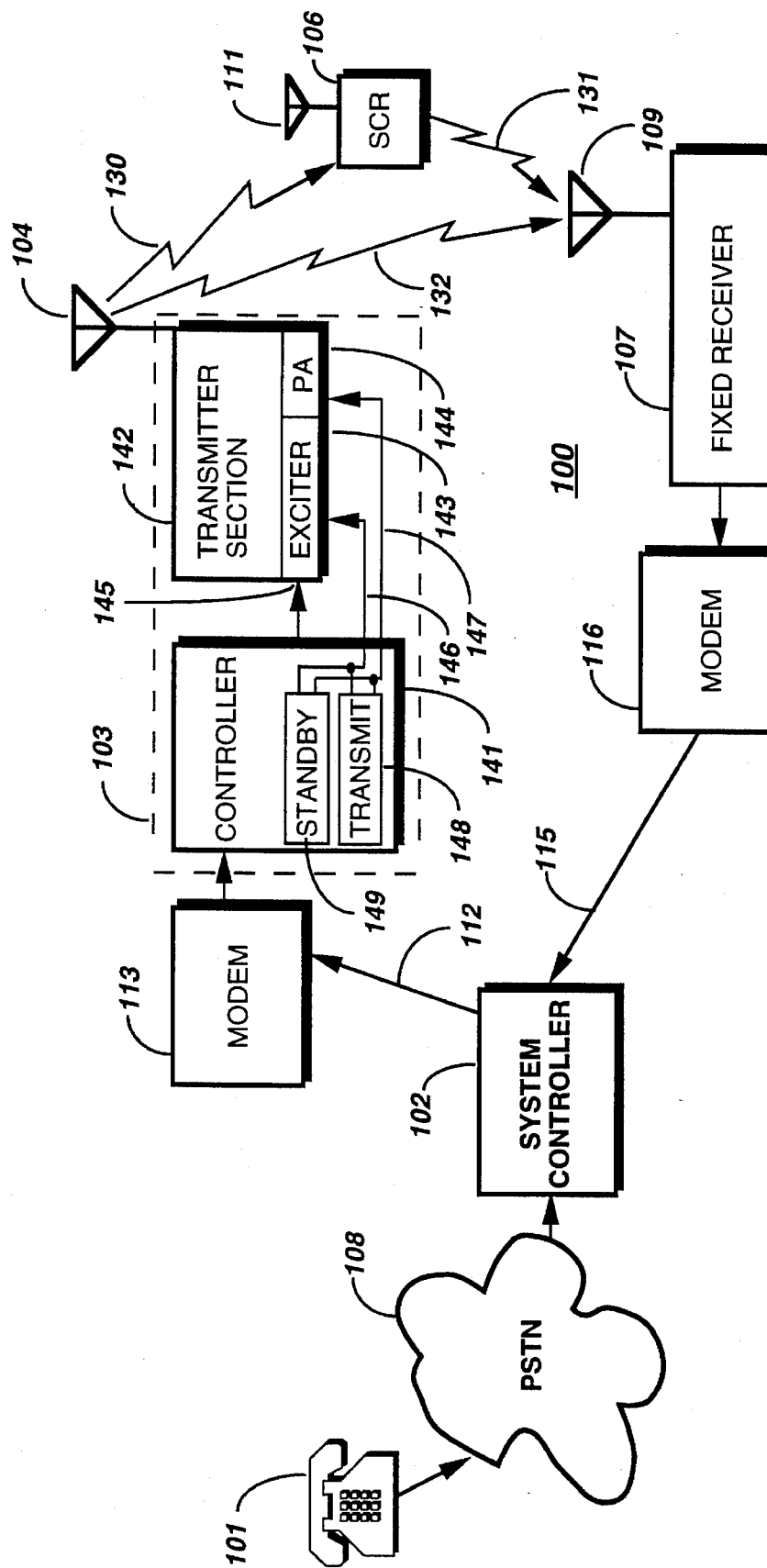
FIG. 1 is an electrical block diagram of a communication system, in accordance with the preferred embodiment of the present invention.

Referring to FIG. 1, an electrical block diagram of a radio communication system 100 is shown in accordance with the preferred embodiment of the present invention. The radio communication system 100 comprises a message input device, such as a conventional telephone 101, connected by a conventional public switched telephone network (PSTN) 108 to a system controller 102. The system controller 102 oversees the operation of at least one system radio frequency (RF) transmitter 103 and at least one system receiver 107, and functions to encode outbound data messages for transmission by the system transmitter 103 to a selective call radio 106. The outbound data messages are transmitted from a conventional antenna 104 coupled to the system RF transmitter 103 and intercepted by an antenna 111, which is an internal antenna within the selective call radio 106. Acknowledgments and inbound data messages are transmitted by antenna 111 in the selective call radio 106, received by a conventional antenna 109, and coupled to the system controller 102, where they are decoded and processed. The inbound and outbound data messages may be digital messages or digitized voice messages. The system controller 102 is coupled to a conventional modem 113 by a link 112. The modem 113 couples the outbound data messages from the system controller 102 to the system RF transmitter 103. The system controller 102 is further coupled to another conventional modem 116 by a link 115. The modem 116 couples the acknowledgments and data messages from the system receiver 107 to the system controller 102. The links 112 and 115 may be conventional dedicated twisted wire pairs, switched telephone lines, conventional microwave links, or any combination thereof.

It should be noted that the system controller 102 is capable of operating in a distributed transmission control environment that allows mixing conventional cellular, simulcast, master/slave, or other coverage schemes involving a plurality of system transmitters 103, conventional antennas 104, system receivers 107, and conventional antennas 109, for providing reliable radio signals within a geographic area as large as a nationwide-network. Moreover, as one of ordinary skill in the art would recognize, the radio communication system functions may reside in separate system controllers 102 which operate either independently or in a networked fashion.

The system controller 102 is preferably a model E09PED0552 PageBridge® paging terminal manufactured by Motorola, Inc., of Schaumburg, Ill. The system controller alternatively could be implemented using a MPS2000® paging terminal manufactured by Motorola, Incorporated of Schaumburg, Ill.

It will be appreciated that other selective call radio devices (not shown in FIG. 1), such as mobile and portable cellular telephones, mobile radio data terminals, mobile cellular telephones having attached data terminals, or mobile radios (trunked and non-trunked) having data terminals attached, are also able to be used in the radio communication system 100. In the following description, the term "selective call transceiver" will be used to refer to the selective call radio 106, personal radio telephone, a mobile cellular telephone, a mobile radio data terminal, a mobile cellular telephone having an attached data terminal, or a mobile radio (conventional or trunked) having a data terminal attached. Each of the selective call transceivers assigned for use in the radio communication system 100 has an address assigned thereto which is a unique selective call address. The address enables the transmission of a message from the system controller 102 only to the addressed selective call transceiver, and identifies messages and responses received at the system controller 102 from the selective call transceiver.

The system transmitter 103 comprises a controller 141 and a transmitter section 142. The outbound data messages and times at which the outbound data messages are to be transmitted are coupled from the system controller 102 through the modem 113 to the controller 141. The controller 141 queues the outbound data messages and couples outbound message information within the outbound data message to the transmitter section 142 for conversion into amplified RF signals 130, hereafter referred to as first information signals 130. The first information signals 130 have a transmit carrier frequency, Fc, which is approximately 940 MHz in the preferred embodiment of the present invention, and are transmitted at times scheduled by the system controller 102. The controller 141 comprises a transmit function 148 and a standby function 149. The transmitter section 142 comprises an exciter 143 and a power amplifier (PA) 144. The outbound message information is coupled from the controller 141 to a modulation input 145 of the exciter 143 in a conventional manner, to generate the first information signal 130. When the exciter 143 is generating the first information signal, the system transmitter 103 is in a transmit state and the transmit function 148 controls the PA 144 by a power control signal 147, which is coupled from the controller 141 to the PA 144, to amplify the first information signal 130 to have a normal transmit power, such as 500 Watts. It will be appreciated that the transmit function 148 of the controller 141 could alternatively control the amplification of the PA 144 to produce other power levels of the first information signal 130 when the system RF transmitter 103 is in the transmit state, such as 250 Watts or 100 Watts, when circumstances warrant lower power levels. The controller 141 is further coupled to the exciter 143 by a frequency control signal 146, which sets the carrier frequency of the exciter 143, and thereby the carrier frequency of all signals being generated by the PA 144, including the first information signals 130. When the system transmitter 103 is in the transmit state the transmit function 148 controls the exciter 143 by the frequency control signal 146 to set the carrier frequency to Fc. In addition to the transmit state, the system has a standby state, during which the carrier frequency of the exciter is controlled by the frequency control signal 146, which is coupled from the standby function 149. Also, during the standby state, the PA 144 is controlled by the power control signal 147, which is also coupled from the standby function 149.

The system RF transmitter 103 is preferably a model MIRS™ model transmitter (Model number T5417A with X133AB, X621AC, X218AA and X581AA options) manufactured by Motorola, Inc. of Schaumburg, Ill., modified to have special firmware elements in the controller 141, as described herein, and with modifications to the exciter 143 and PA 144 to increase power and to operate at the frequency Fc (approximately 940 MHz) instead of the standard frequency range for the MIRS™ transmitter, which is 851 MHz to 860 MHz.

Information included within the first information signals 130 by the system controller 102 is received, decoded, and used by the selective call transceivers to schedule the acknowledgments and data messages, which are included in second information signals 131. The second information signals 131 are radio signals which have a receive carrier frequency, Fr. In the preferred embodiment of the present invention, the receive carrier frequency Fr is the same as, or very close to, Fc.

Figure 2:
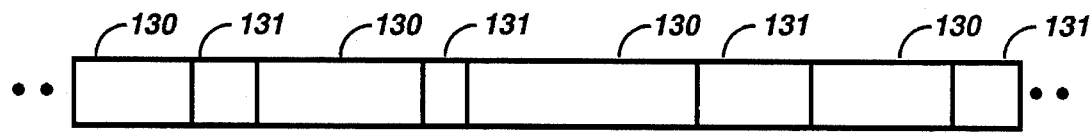
FIG. 2 is a timing diagram of signals transmitted by a fixed transmitter and a selective call transceiver operating in the communication system, in accordance with the preferred embodiment of the present invention.

Referring to FIG. 2, a timing diagram of signals transmitted by the system transmitter 103 and the selective call transceiver operating in the communication system 100 is shown, in accordance with the preferred embodiment of the present invention. The system controller schedules the first information signals 130 and the second information signals 131 to occur in a sequential manner, without overlap, even though the durations of the first information signals 130 are not necessarily equivalent. This is a time division duplex operation at the frequency Fc.

Figure 3:
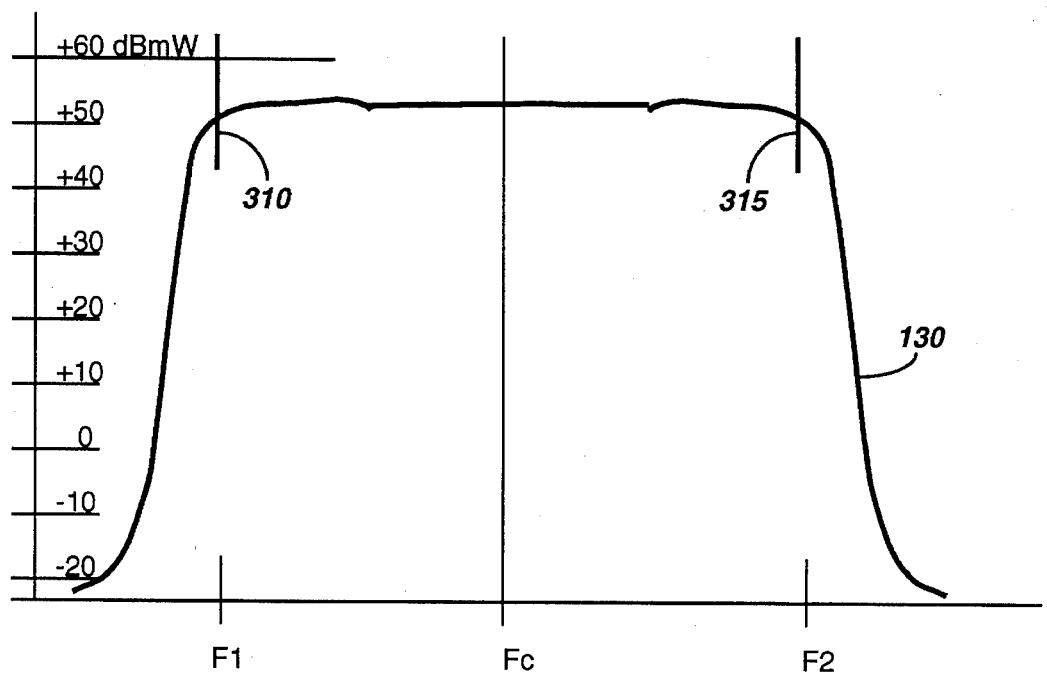
FIG. 3 is a spectral diagram of a first information signal transmitted by the system transmitter, in accordance with the preferred embodiment of the present invention.

Referring to FIG. 3, a spectral diagram of the first information signal 130 transmitted by the system transmitter 103 is shown, in accordance with the preferred embodiment of the present invention. The first information signal 130 has an average power level of +57 dBmW, centered about a carrier frequency Fc, and has 3 dB band edges 310, 315 at frequencies F1 and F2, and thus has a 3 dB bandwidth of F2 minus F1, which is approximately 45 kHz.

Figure 4:
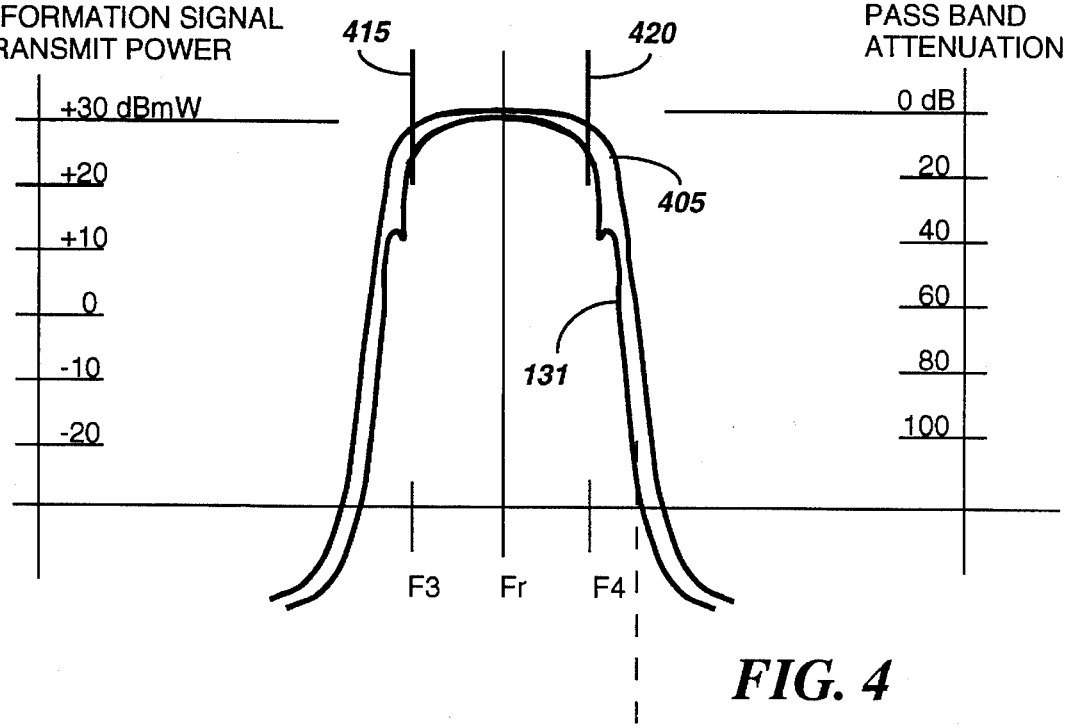
FIG. 4 is a spectral diagram of a second information signal transmitted by the selective call transceiver and a frequency plot of a pass band of a system receiver for receiving the second information signal, in accordance with the preferred embodiment of the present invention.

Referring to FIG. 4, a spectral diagram of the second information signal 131, transmitted by the selective call transceiver, and a frequency plot of a pass band 405 of the system receiver 107 for receiving the second information signal 131 is shown, in accordance with the preferred embodiment of the present invention. The second information signal 131 has an average power level of +30 dBmW, centered about a carrier frequency, Fr, and has 3 dB band edges 415, 420 at frequencies F3 and F4, and thus has a 3 dB bandwidth of F4 minus F3, which is approximately 16 kHz. Thus, the second information signal 131 has a significantly narrower bandwidth than the first information signal 130 in the preferred embodiment of the present invention. The system receiver 107 is a conventional system receiver which comprises a combination of RF and intermediate frequency (IF) filters, which provide a composite pass band 405 which is optimized for rejecting undesired signals while passing the desired second information signals 131. The composite pass band 405 has 3 dB attenuation points at frequencies F3 and F4, and thus also has a bandwidth of F4 minus F3, in accordance with the preferred embodiment of the present invention. It will be appreciated that the pass band 405 could alternatively be somewhat different (typically wider to allow for inaccuracies in setting Fr) than the bandwidth of the second information signal 131.

The system receiver is preferably a MIRS model receiver (Model T5417A with options X171AA, X581AA, and X621AC) manufactured by Motorola, Inc., of Schaumburg, Ill., modified to operate at the frequency Fr, which is approximately 940 MHz in the preferred embodiment of the present invention.

Referring back to FIG. 1, a residual signal 132 is shown. The residual signal 132 is the undesired power that radiates directly from the system transmitter 103 and/or from the antenna 104 when the system transmitter 103 is in the standby state, while a second information signal 131 is being transmitted from a selective call transceiver. The residual signal 132 and the second information signal 131 are received simultaneously by the fixed receiver 107, at power levels determined by the relative locations of the antennas 104 and 109, the selective call transceiver, and the design of the system transmitter 103.

Figure 5:
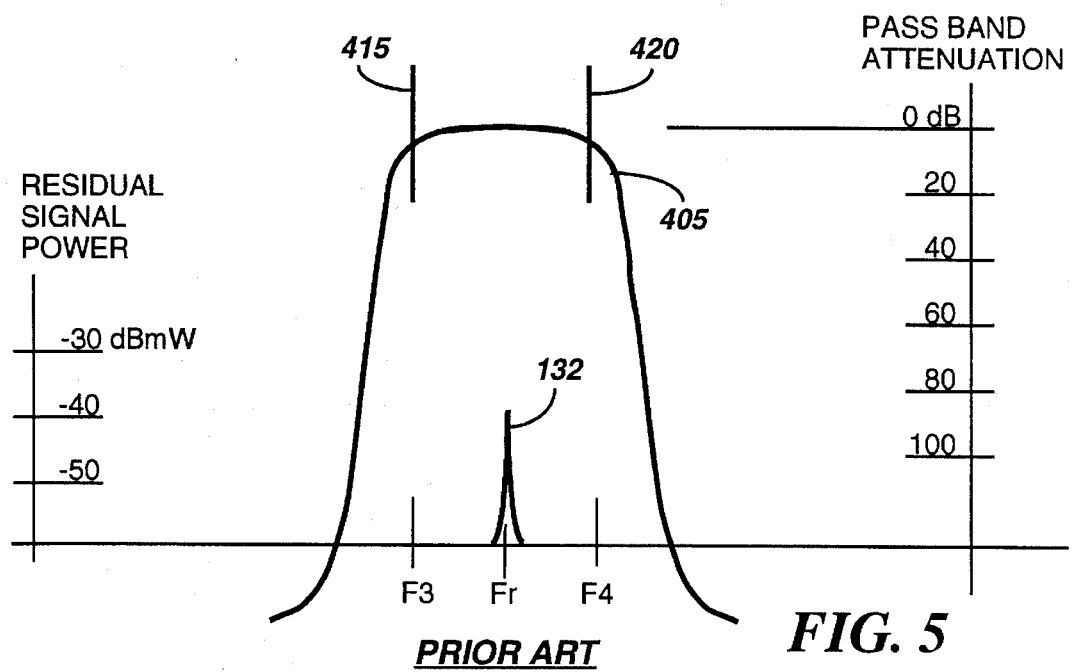
FIG. 5 is a spectral diagram of a residual signal transmitted by a prior art system transmitter and the frequency plot of the pass band of the fixed receiver for receiving the second information signal.

Referring to FIG. 5, a spectral diagram of the residual signal 132 transmitted by the system transmitter 103 is shown, in accordance with prior art system transmitters 103. The residual signal 132 is approximately 95 dB lower than the rated power output (the maximum power level which the PA 144 is designed to generate on a continuous duty cycle basis), after the residual power level has stabilized. The residual power level at the system RF transmitter 103 is therefore approximately 95 dB below 500 Watts (+57 dBmW), which is approximately −38 dBmW. The residual signal 132 is transmitted at frequency Fc in prior art system transmitters 103 when the system transmitter 103 is in the standby state. When received at a system receiver 107 which is located within approximately 4 miles or less of the system transmitter 103, this residual signal 132, is significantly above a threshold sensitivity of the system receiver 107, and therefore can interfere with a second information signal 131 arriving at the system receiver 107 from a selective call transceiver, causing errors in or complete loss of the second information signal. The amount of degradation is dependent on several factors, such as the gains of the antennas 104, 109, 111, the transmit power of the selective call transceiver, the losses in the paths attributable to environmental factors of the paths traversed by the second information signal 131 and the residual signal 132, and the threshold sensitivity of the system receiver 107. Two ways well known to one of ordinary skill in the art to solve the problem of the residual signal interference are first, to add RF switches and loads into the transmitter. This approach, though, is expensive. The second way is to restrict the location of the receiving antenna 109 to be sufficiently far from the transmitting antenna 104. This approach can be expensive and limiting to the system design due to a tradeoff between altered coverage areas versus additional system receivers 107 and antennas 109.

Figure 6:
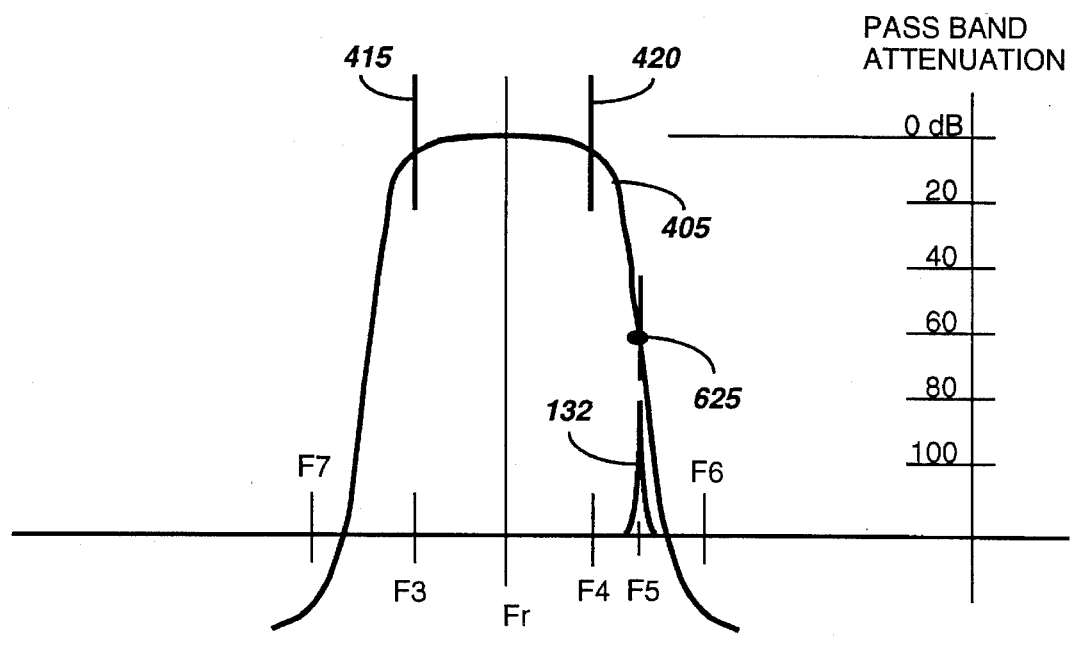
FIG. 6 is a spectral diagram of a residual signal transmitted by the system transmitter and the frequency plot of the pass band of the fixed receiver for receiving the second information signal, in accordance with the preferred embodiment of the present invention.

Referring to FIG. 6, a spectral diagram of the residual signal 132 transmitted by the system transmitter 103 is shown, in accordance with the preferred embodiment of the present invention. The residual signal is, again, approximately 95 dB lower than the rated power output, after the residual power level has stabilized. The residual power level at the system transmitter 103 is therefore approximately −38 dBmW. The residual signal 132 is transmitted at frequency F5 in accordance with the preferred embodiment of the present invention when the system transmitter 103 is in the standby state. Frequency F5 is outside the 3 dB band edge 420 of the pass band 405, at a point 625 where the pass band attenuation is approximately 60 dB. Therefore, the residual signal 132 in accordance with the preferred embodiment of the present invention has a signal level of approximately the sum of −38 dBmW, plus antenna gains minus path losses, and minus 60 dB attenuation, at the system receiver 107, which renders the residual signal 132 essentially non-interfering. It will be appreciated that the point 625 in the preferred embodiment of the present invention is on one of two portions of the pass band known as the skirts, to one of ordinary skill in the art. The skirt portion is generally understood to extend approximately from 3 dB attenuation point 420 or 425 to the measurable noise floor of the pass band, and each skirt generally spans a frequency range which does not exceed the bandwidth, F4 minus F3 of the pass band. A lower skirt of the pass band 405 in FIG. 6 extends from F4 to F6 and the upper skirt extends from F7 to F3.

Figure 7:
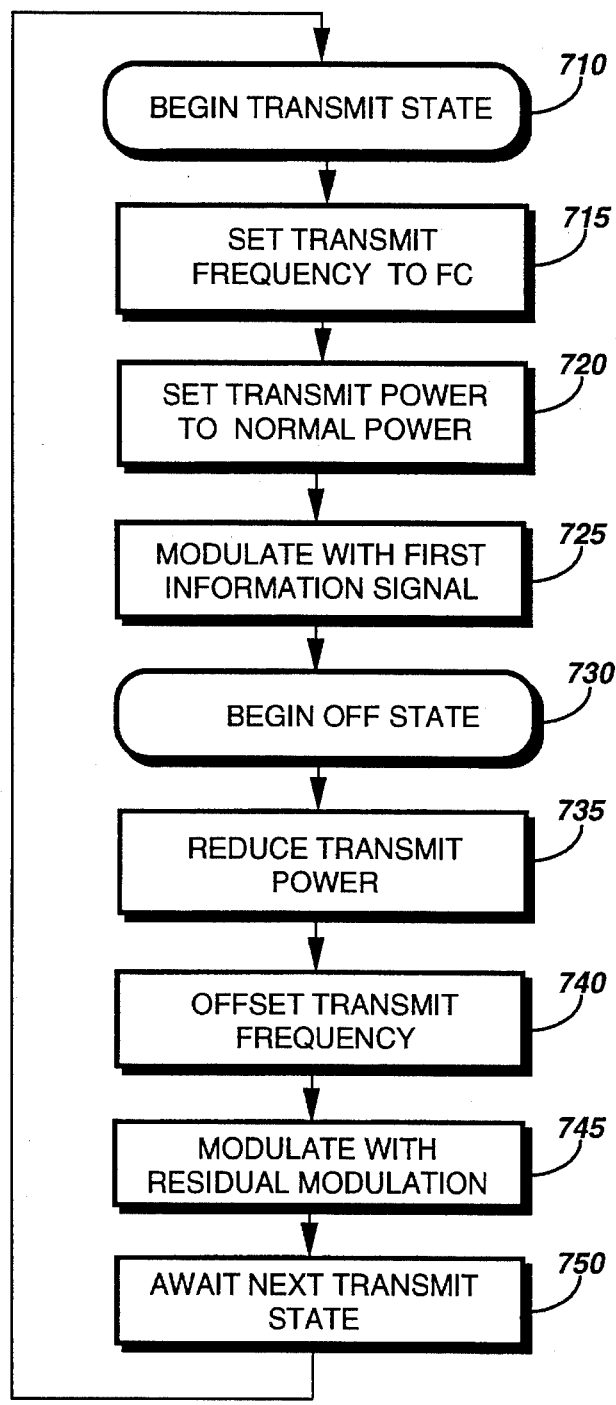
FIG. 7 is a flow chart showing a method used in the fixed transmitter, in accordance with the preferred embodiment of the present invention.

Referring to FIG. 7, a flow chart showing a method used in the system transmitter 103 for eliminating interference from the residual signal 132 is shown, in accordance with the preferred embodiment of the present invention. At step 710, the system transmitter 103 begins the transmit state and the transmit function adjusts the frequency control signal 146 coupled to the exciter 143 at step 715 to set the carrier frequency of the first information signal 130 to a predetermined center frequency Fc. At step 720, the transmit function adjusts a power control signal 147 coupled to the PA 144 to turn on the PA 144 by adjusting the power level of the signal to a normal power state of 500 Watts. At step 725, the data message information is applied to the exciter 143, generating the first information signal 130. When the transmission of the first information signal 130 is completed, the standby state is started, at step 730. The standby function 149 adjusts the power control signal 147 coupled to the PA 144 to turn off the PA 144 at step 735, which reduces the power level of the signal by approximately 95 dB, to a low power state. The standby function 149 also adjusts the frequency control signal 146 coupled to the exciter 143 to offset the carrier frequency outside the pass band of the system receiver 107, at step 740. The modulation applied to the exciter 143 is set to a residual state, which in the preferred embodiment is with a null signal (no signal) applied to the modulation input 145 of the exciter 143. The second information signal time period continues, at step 750, until a next first information signal is scheduled to begin at step 710.

In an alternative embodiment of the present invention, the bandwidth of the second information signal 131 and the pass band 405 are narrower than the bandwidth of the first information signal 130, as described above with respect to the preferred embodiment of the present invention, but the center frequency, Fr, of the second information signal 131 and of the pass band 405 are not at Fc. However, the frequency Fr is offset from Fc less than an amount which would cause the skirts of the pass band of the system receiver 107 to be wholly outside the bandwidth of the first information signal 130. The communication system 100 is therefore still a single frequency time division duplex system. In these circumstances, it will be appreciated that the residual signal 132 can be offset beyond the band edges 415, 420 of the pass band and still remain within the bandwidth of the first information signal 130, thus obtaining the same substantial attenuation from the system receiver's pass band 405. In the preferred and alternative embodiments described above, it will be appreciated-that by remaining with the bandwidth of the first information signal 130, the residual signal will remain with the frequency channel authorized for the first information signal.

It will be further appreciated that in another alternative embodiment of the present invention, the bandwidth of the second information signal 131 and the pass band 405 are approximately equal to the bandwidth of the first information signal 130, and the center frequency, Fr, of the second information signal 131 and of the pass band 405 are at Fc. The communication system 100 is therefore still a single frequency time division duplex system. In many systems of this type, the frequency of the residual signal 132 can be offset just outside the pass band of the system receiver 107, for example within one of the skirts of the pass band 405, to achieve the same substantial attenuation of the pass band of the system receiver 107 as achieved in the preferred and alternative embodiments described above, without causing interference with other systems. Such concern for interference does not arise in the preferred and alternative embodiments described above, because in these embodiments the residual signal is within the bandwidth of the first information signal 130, and therefore entirely within an authorized channel.

In any of the preferred and alternative embodiments described above, the residual modulation signal applied by the controller 141 to the modulation input 145 of the exciter 143 during the standby state of the system transmitter 103 can alternatively be set to a tone or other predetermined signal, in order to spread out the spectrum and further lower the peak power of the residual signal 132, in a manner well known to one of ordinary skill in the art. This approach may be desirable, for example, in system transmitters 103 of other than the preferred model wherein the amount of power attenuation obtained by turning off the transmitter section is not as much as that obtained in the preferred MIRS™ transmitter.

It will be appreciated that the preferred and alternative embodiments of the present invention described above can provide additional benefits when applied to the design of the selective call transceiver, when the selective call transceiver is equipped with an exciter in which the transmit frequency of the selective call transceiver can be offset independently of the receiver frequency of the selective call transceiver. A design provision in the selective call transceiver for transmit frequency offset in accordance with the preferred or alternative embodiments of the present invention can be a cost effective approach to preventing interference between a residual transmit signal of the selective call transceiver and the first information signal 130 received by the selective call transceiver. The cost effectiveness will generally be greater in selective call transceivers designed for to have high transmit power, such as 100 Watts in a mobile transceiver.

It will be further appreciated that the benefits derived by the embodiments of the present invention described above are also attainable in time division optical communication systems, such as TDD infra-red optical communication system, in as much as the same principles of electromagnetic energy generation and frequency filtering apply.

By now it should be appreciated that there has been provided a method and apparatus which reduces interference in a time division duplex (TDD) communication system, in a manner which is very cost effective to implement, thereby improving communication system coverage and performance without adding system receivers or costly parts to system transmitters.

We claim:

1. A method for use in a first transmitter which reduces an interference in a time division duplex (TDD) communication system having the first transmitter, a second transmitter, and a receiver, wherein the first transmitter alternates from a transmit state in which a first information signal having a first bandwidth is transmitted to a standby state in which a residual signal is transmitted, and wherein, during the standby state of the first transmitter, the second transmitter transmits a second information signal having a second bandwidth smaller than the first bandwidth, and wherein the receiver has a composite pass band having a bandwidth substantially equivalent to the second bandwidth, the method comprising the steps of:

generating the residual signal at a residual power level when the first transmitter is in the standby state; and offsetting a carrier frequency of the first transmitter to move the residual signal outside the second bandwidth and within the first bandwidth when the first transmitter is in the standby state.

2. The method according to claim 1, further comprising the steps of:

generating the first information signal at a normal power level when the first transmitter is in the transmit state; and setting the carrier frequency of the first transmitter within the pass band of the receiver when the first transmitter is in the transmit state.

3. A first transmitter which reduces an interference in a time division duplex (TDD) communication system having the first transmitter, a second transmitter, and a receiver, wherein the first transmitter alternates between a transmit state in which a first information signal having a first bandwidth is transmitted and a standby state in which a residual signal is transmitted, and wherein, during the standby state of the first transmitter, the second transmitter transmits a second information signal having a second bandwidth smaller than the first bandwidth, and wherein the receiver has a composite pass band having a bandwidth substantially equivalent to the second bandwidth, the first transmitter comprising:

a transmitter section which transmits the first information signal and the residual signal, said transmitter section comprising:

a power amplifier to amplify the first information signal and the residual signal to a power level; and an exciter to control a carrier frequency of the first information signal and the residual signal; and a controller which is coupled to said power amplifier and said exciter, for adjusting the power level to a residual power level and for offsetting the carrier frequency outside the second bandwidth and within the first bandwidth during the standby state.

4. The first transmitter according to claim 3, wherein said controller comprises a transmit function coupled to said power amplifier and exciter for adjusting the power level to a normal power level and for adjusting the carrier frequency within the pass band of the receiver when the first transmitter is in the transmit state.

5. The first transmitter according to claim 3, wherein said exciter has a modulation input for accepting a signal which modulates the first information signal, and wherein said controller is further coupled to the modulation input for applying outbound message information thereto when the first transmitter is in the transmit state and a predetermined signal thereto when the first transmitter is in the standby state.

6. The first transmitter according to claim 5, wherein the predetermined signal is a null signal.

7. The first transmitter according to claim 3, wherein the carrier frequency is a radio frequency.

8. The first transmitter according to claim 3, wherein the carrier frequency is an optical frequency.

9. The first transmitter according to claim 6, wherein the first transmitter is a fixed site transmitter.

10. The first transmitter according to claim 3, wherein the second transmitter is a portion of a selective call transceiver.

11. A method for use in a first transmitter which reduces an interference in a time division duplex (TDD) communication system having the first transmitter, a second transmitter, and a receiver, wherein the first transmitter alternates between a transmit state in which a first information signal having a first bandwidth is transmitted and a standby state in which a residual signal is transmitted, and wherein, during the standby state of the first transmitter, the second transmitter transmits a second information signal having a second bandwidth, and wherein the receiver has a composite pass band having a bandwidth substantially equivalent to the second bandwidth, the method comprising the steps of:

generating the first information signal at a normal power level, modulating the first information signal with outbound message information, and setting the carrier frequency of the first transmitter within the second bandwidth when the first transmitter is in the transmit state; and generating the residual signal at a residual power level, modulating the residual signal with a predetermined signal, and offsetting a carrier frequency of the first transmitter to move the residual signal outside the second bandwidth when the first transmitter is in the standby state.

12. A first transmitter which reduces an interference in a time division duplex (TDD) communication system having the first transmitter, a second transmitter, and a receiver, wherein the first transmitter alternates between a transmit state in which a first information signal having a first bandwidth is transmitted and a standby state in which a residual signal is transmitted, and wherein, during the standby state of the first transmitter, the second transmitter transmits a second information signal having a second bandwidth, and wherein the receiver has a composite pass band having a bandwidth substantially equivalent to the second bandwidth, the first transmitter comprising:

a transmitter section which transmits the first information signal and the residual signal, said transmitter section comprising:

a power amplifier to amplify the first information signal and the residual signal to a power level; and an exciter to control a carrier frequency of the first information signal and the residual signal; and a controller which is coupled to said power amplifier and said exciter, for adjusting the power level to a normal power level, modulating the first information signal with outbound message information, and setting the carrier frequency of the first transmitter within the second bandwidth when the first transmitter is in the transmit state, and for adjusting the power level to a residual power level, modulating the residual signal with a predetermined signal, and offsetting a carrier frequency of the first transmitter to move the residual signal outside the second bandwidth when the first transmitter is in the standby state.

* * * * *